United States Patent [19]

Boone

[11] 4,241,392
[45] Dec. 23, 1980

[54] LIGHT DEFLECTOR FOR USE IN ILLUMINATION APPARATUS

[75] Inventor: Arthur M. Boone, Pittsford, N.Y.

[73] Assignee: Eastman Kodak Company, Rochester, N.Y.

[21] Appl. No.: 930,284

[22] Filed: Aug. 2, 1978

[51] Int. Cl.³ .......................... F21V 7/00; G03B 27/54
[52] U.S. Cl. ..................................... 362/342; 355/67; 362/346
[58] Field of Search .............. 362/223, 298, 301, 342, 362/346, 279, 290–292, 297, 303, 341; 355/67–71

[56] References Cited

U.S. PATENT DOCUMENTS

| | | | |
|---|---|---|---|
| 1,902,860 | 3/1933 | Kay et al. | 362/198 X |
| 3,272,066 | 9/1966 | Rice | 355/70 |
| 3,428,397 | 2/1969 | Elmer | 355/70 X |
| 3,586,849 | 6/1971 | Starkweather et al. | 362/222 |
| 3,737,226 | 6/1973 | Shank | 355/67 |
| 3,777,135 | 7/1972 | Rees | 362/225 |
| 3,878,390 | 4/1975 | Feder | 362/290 X |
| 3,977,784 | 8/1976 | Hara | 355/67 |
| 3,982,116 | 8/1975 | Sakuma | 362/304 |
| 4,092,705 | 5/1978 | Hogberg | 362/294 |

FOREIGN PATENT DOCUMENTS 1353141  5/1974  United Kingdom ...................... 355/70

OTHER PUBLICATIONS

Roberts, Copier Machine Illumination Package, IBM Technical Disclosure Bulletin, vol. 19, No. 2, Jul. 1967, pp. 384–385.

Primary Examiner—L. T. Hix
Assistant Examiner—Thomas H. Tarcza
Attorney, Agent, or Firm—D. M. Woods

[57] ABSTRACT

Light deflection apparatus is provided for use with apparatus for uniformly illuminating a planar original in which light rays emanating from a flash lamp are blocked from directly striking the original. The deflection apparatus includes a plurality of elongated reflective louvers juxtaposed in the path of direct light rays to deflect the rays along a predetermined path. A planar reflector positioned adjacent the original in the path intercepts and reflects the light rays upon and illuminates the original.

2 Claims, 3 Drawing Figures

LIGHT DEFLECTOR FOR USE IN ILLUMINATION APPARATUS

BACKGROUND OF THE INVENTION

1. Field of the Invention

This invention generally relates to illumination apparatus, and particularly to an arrangement of light reflectors for efficiently using light emitted from a single light source to uniformly illuminate an original. The present apparatus is particularly useful in illuminating originals in a photographic printer, although the apparatus is equally adapted for use with other types of copiers, e.g., electrographic copiers.

2. Description Relative to the Prior Art

Apparatus for illuminating an original generally falls into two categories, each adapted to achieve the same result by a different engineering approach. One approach involves illuminating a slit through which the original is line-imaged by an optical system upon a photosensitive surface. Either the original moves past the illuminated slit or the slit moves over a stationary original to achieve the same result. In both cases the image is built up line by line on the photosensitive surface. The other approach involves illuminating an entire copy plane in which the original is positioned. The latter approach requires at least a momentary phase in the copy cycle when all parts of the original may be simultaneously imaged on the photosensitive surface, i.e., the image of the document is at least momentarily stationary with respect to the photosensitive surface. For example, a short exposure of the original effectively "freezes" motion with respect to a moving photosensitive belt.

Exemplary of the first approach is U.S. Pat. No. 3,982,116 which describes a single light source and an arrangement of mirrors for reflecting light through a slit defined transversely to a copy platen. The mirrors surrounding the light source are designed to converge light rays to a line focus beyond the slit. By placing an original on the platen, and moving the platen relative to the slit, the converging light rays scan the surface of the original.

The second approach is illustrated by copy machines described in each of U.S. Pat. Nos. 3,586,849 and 3,777,135. In each machine, an original is placed upon a transparent support platen mounted relative to an illumination lamp assembly. In order to provide homogeneous illumination, four lamps are orthogonally spaced around each edge of the original. By means of reflectors with compound surfaces (i.e., both planar and curved surfaces), light rays emitted from each lamp are reflected upon the surface of the original such that they overlap and complement rays from the opposing lamp. The light rays reflected from the surface of the original produce image light corresponding to the informational areas on the original. The image light traverses an optical system and exposes the photosensitive surface of a flexible photoconductive belt arranged on a belt assembly.

The application served by these conventional approaches involves substantially opaque material situated in a copier such that light reflects from the opaque surface to a photosensitive surface. Unlike a transparency, which may be illuminated from a light source substantially on the optical axis of the copier, the light source for reflection copying is offset from the optical axis; otherwise the illumination source would block the image from reaching the photosensitive surface. In practice, because uniform illumination is required, it is common to use several light sources. Each source is spaced from one side of the opaque original.

Illumination of an original using a plurality of light sources is a satisfactory approach in some applications. However, in other applications this approach has significant limitations. For example, in a photographic printer where an image is projected from a color print to photosensitive color paper, the spectral characteristics of each lamp must be considered in arriving at proper exposure times and color filtration for a given paper. Not only do many lamps differ initially in spectral distribution, but lamp aging causes the distribution for each lamp to change at an individual rate.

The potential for unwanted color variability therefore increases as the number of light sources increase. Matching the lamps with proper filters to maintain a proper spectral distribution is difficult at best. To worsen matters, the burden is thrown upon the photofinisher rather than the manufacturer. Each light source would require its own set of color filters to control the spectral characteristic of light from that source. The mere number of components that must therefore be matched becomes unmanageable.

U.S. patent application Ser. No. 930,287 in the names of A. M. Boone, J. F. Bloemendaal and A. R. Zanolli, filed concurrently with and assigned to the same assignee as the present application, describes illumination apparatus which effectively reduces the aforementioned problems by providing uniform illumination of an original with a single flash lamp. A pair of parabolic reflectors partially surround the lamp and direct two separate collimated bundles of light toward opposite sides of the original. A planar reflector positioned in the path of each collimated bundle of light intercepts and reflects the collimated light rays upon the original to uniformly illuminate the original from opposite sides.

One problem with illumination apparatus such as described in the copending application Ser. No. 930,287 is that some light emanating directly from the lamp may strike the original without reflecting from any of the reflectors in the system. This condition interferes with uniform illumination of the original and, with certain types of originals, causes specular reflections through the optical system to the photosensitive paper. These reflections show up as blotches on the copy print.

Consequently, the illumination apparatus described in the copending application also included a light baffle positioned between the light source and the original to substantially prevent light rays from passing directly between the source and the original. While the baffle provides the effect desired, a portion of the light energy generated by the lamp is thereby lost to the system.

SUMMARY OF THE INVENTION

The present invention provides apparatus for use in an illumination system for intercepting the otherwise harmful direct rays and diverting them for useful purposes within the system. The potentially harmful rays are generated by an elongated light source positioned in spaced relationship with an object to be illuminated. Light deflector means are positioned between the light source and the object in the path of light rays emanating from the source and directly verging on the object for reflecting the direct rays along a predetermined path. Reflecting means are positioned in the predetermined path in spaced relationship with the object for reflecting the deflected direct rays upon the object, where they contribute with other rays in the illumination system to illuminate the object.

The light deflector means may take the form of a plurality of elongate planar reflecting surfaces juxtaposed in the path of the direct light rays. Each of the juxtaposed surfaces reflects a portion of the direct rays toward the reflecting means.

In the disclosed embodiment, the light deflector is described for use in a photographic printer where the primary illuminating rays are collimated by two elongated parabolic reflecting surfaces positioned on opposite sides of the light source. The illuminating rays emerge as two collimated bundles that are incident upon a pair of planar mirrors on opposite sides of the object. From there the bundles reflect upon and uniformly illuminate the object. Direct rays strike a plurality of elongate planar reflective louvers juxtaposed in their path and reflect to one of the planar mirrors. From there the deflected direct rays reflect upon and contribute to illumination of the object.

BRIEF DESCRIPTION OF THE DRAWINGS

A preferred embodiment of the invention will be described with reference to the figures, wherein.

DETAILED DESCRIPTION OF THE INVENTION

Because illumination apparatus in general are well known, as are photographic and other copying machines, the present description will be directed in particular to elements forming part of, or cooperating more directly with, the present invention. Elements not specifically shown or described may take various forms well known to those skilled in the art.

Figure 1:
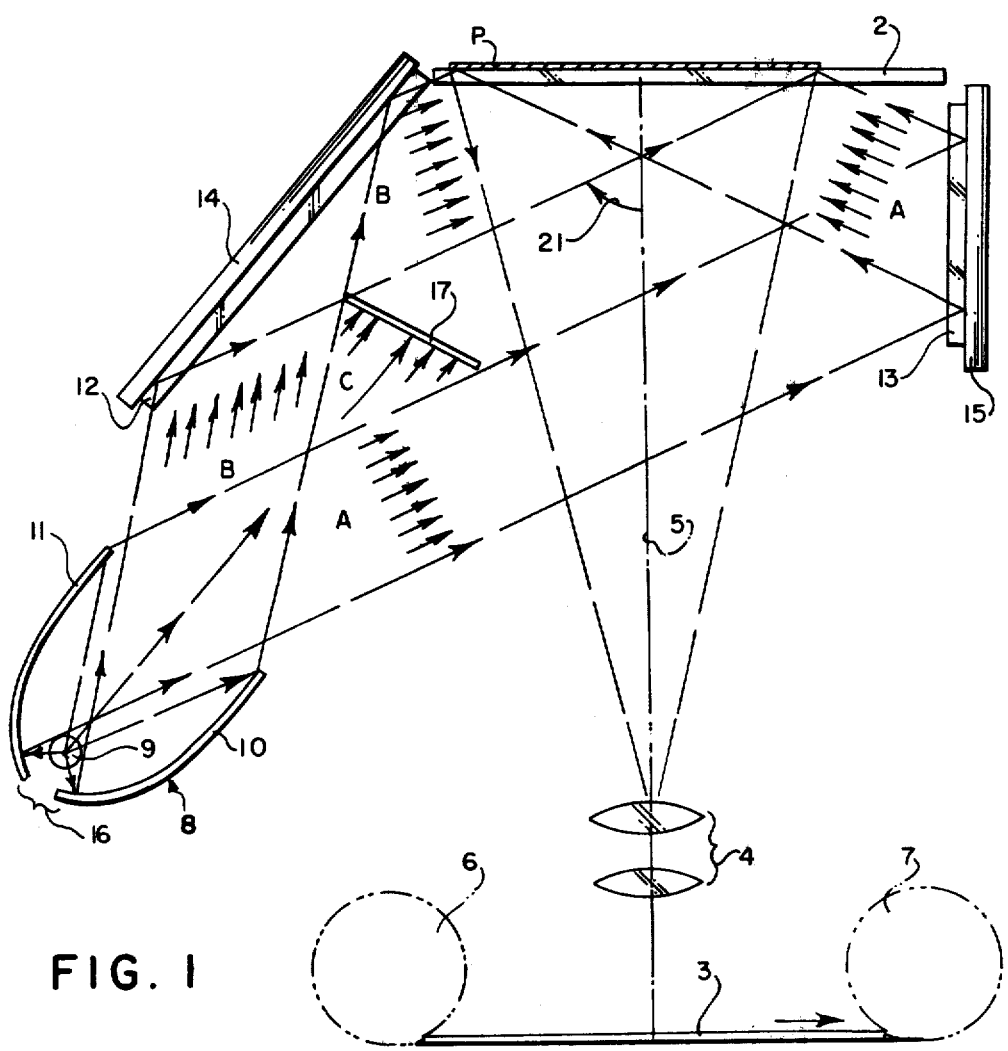
FIG. 1 is a schematic plan view of the elements of an illumination apparatus as disclosed in copending patent application Ser. No. 930,287.

Referring particularly to FIG. 1, an illumination apparatus is illustrated as substantially described in copending U.S. patent application Ser. No. 930,287, filed Aug. 2, 1978. Portions of that apparatus will be described herein as needed to facilitate an understanding of the present invention. However, the entire application Ser. No. 930,287 is understood to be hereby incorporated into this disclosure by reference. In FIG. 1, the illumination apparatus is illustrated as a component in a copy machine. For purposes of illustration, the copy machine is embodied as a photographic printer for producing copies of photographic prints. As original to be reproduced, such as a planar, rectangular print P, is positioned on a transparent copy platen 2 for casting an image on a photosensitive material 3 through a focusing lens 4. The print P is placed on the copy platen 2, as for example, by hand or by suitable transport apparatus (not shown). Being an opaque copy, the print P is imaged in the printer by means of reflected light. As shown, the reflected light generally follows an optical axis 5 of the printer. Therefore, it is desirable that the illumination apparatus not obstruct reflected light passing along the optical axis 5.

The focusing lens 4 can be of any known design which will produce a sharp image on the photosensitive material 3. As shown in phantom the photosensitive material 3 may be a continuous web of photographic paper transported between a supply reel 6 and a take-up reel 7. The reel may be rotated to advance the paper incrementally in conjunction with the placement, and repeated exposure, of prints on the copy platen 2. Apparatus for producing such cyclical and interlocked motion are well known in the art of copiers generally, and, more particularly in the art of photographic printing. After the entire roll of paper is exposed, the latent images are processed in the usual manner and the individual prints are separated for return to the customer.

The illumination apparatus includes a lamphouse 8 having an elongated light source 9 partially surrounded by two elongated half-parabolic reflectors 10 and 11. The light source preferably comprises a small diameter elongated tubular element, such as for example a Xenon-arc tubular lamp, which is electrically connected to a suitable power source (not shown). The light source is positioned in a suitable support, such as the support 26 illustrated in FIG. 3. Because, as earlier mentioned, the optical axis 5 of the printer optical system must not be obstructed, the lamphouse 8 is canted to one side of the axis 5, as best illustrated in FIG. 1.

A pair of planar reflectors 12 and 13 are provided adjoining the copy platen 2 for diverting light from the lamphouse 8 to the copy platen 2. Being transparent, the platen 2 permits light to substantially transmit through and illuminate the print P. Each mirror 12 and 13 is aluminum coated so that absorption and dispersion is minimized to produce high efficiency diversion of the impinging light rays. The mirrors 12 and 13 are mounted on supporting members 14 and 15, respectively. Each support 14 and 15 is positioned with respect to the copy platen 2 so that at least the area bounded by the print P is fully illuminated by light reflected from each of the mirrors 12 and 13. The amount of inclination of the mirror 12 with respect to the copy platen 2 is a function of the angle of reflection of impinging light rays upon the mirror 12. Similarly the inclination of the mirror 13 depends on the angle of the rays impinging upon it.

The half parabolic reflectors 10 and 11 represent sections of separate parabolic volumes. The parabolic reflectors are so positioned that their focus axes coincide. Since the parabolic surfaces are cylindrical in their lengthwise direction the principal focus is also linear. The light source 9 is placed substantially at the principal focus line of both reflectors. Therefore the length of the source 9 is closely aligned with the linear focus of the half parabolic segments 10 and 11. As is well known, light rays which emanate from a point source at the focus of a parabolic mirror are collimated, i.e., parallel, after they reflect from its source. The light source 9, being nominally at the focus of each of the parabolic mirrors 10 and 11, emits light rays which reflect from each mirror as two separate bundles of substantially parallel rays. The separation of light rays into two bundles is thus effected by the use of two half-parabolic reflectors positioned to have a common focus line. Since the reflectors 10 and 11 are separate, a gap—denoted by reference character 16 is formed between reflectors 10 and 11.

It was found that certain angles of incidence of the light rays caused deleterious effects in the photographic image on the photosensitive material 3. For example, if the angle of light incidence relative to the optical axis 5—as indicated by a reference character 21—is less than about 65°, specular reflection may occur from the surface of the print P and light rays will reflect directly into the optical system through the lens 4 and onto the photosensitive material 3. This effect is particularly pronounced if the print P has a strongly textured surface. These reflections will show up as unwanted bright blotches on the finished copy print. Consequently, the illumination apparatus is designed to bring light rays onto the copy platen 2 at an angle of at least 65°. This angle, and any greater angle, was found to prevent the unwanted specular reflection. Lesser angles increase specular reflection in the case of textured prints; however, such angles may be acceptable if non-textured prints are being illuminated.

Some of the light rays emanate directly from the light source 9 without striking the parabolic reflectors 10 or 11. A portion of these rays strike the planar reflectors 12 or 13 and, because of their angle of incidence, either reflect out of the illumination apparatus or contribute to the illumination of the print P. Those rays illuminating the print P are few compared to the collimated rays and are effectly swamped by the latter so that uniform illumination remains unaffected. Furthermore, the angle at which these rays impinge on the print P is at least 65° relative to the optical axis 5 so that the aforementioned specular reflection is not a problem. However, another portion of these direct light rays verge directly upon the copy platen 2—and therefore the print P—without reflecting from any surface. These rays—shown as a bundle C in FIG. 1—will impinge at an angle substantially less than 65° and therefore cause serious specular reflection from a print P that is strongly textured. For that reason, in copending application Ser. No. 930,287, a light baffle 17 is positioned to block this portion of direct rays from directly striking the copy platen 2.

Figure 2:
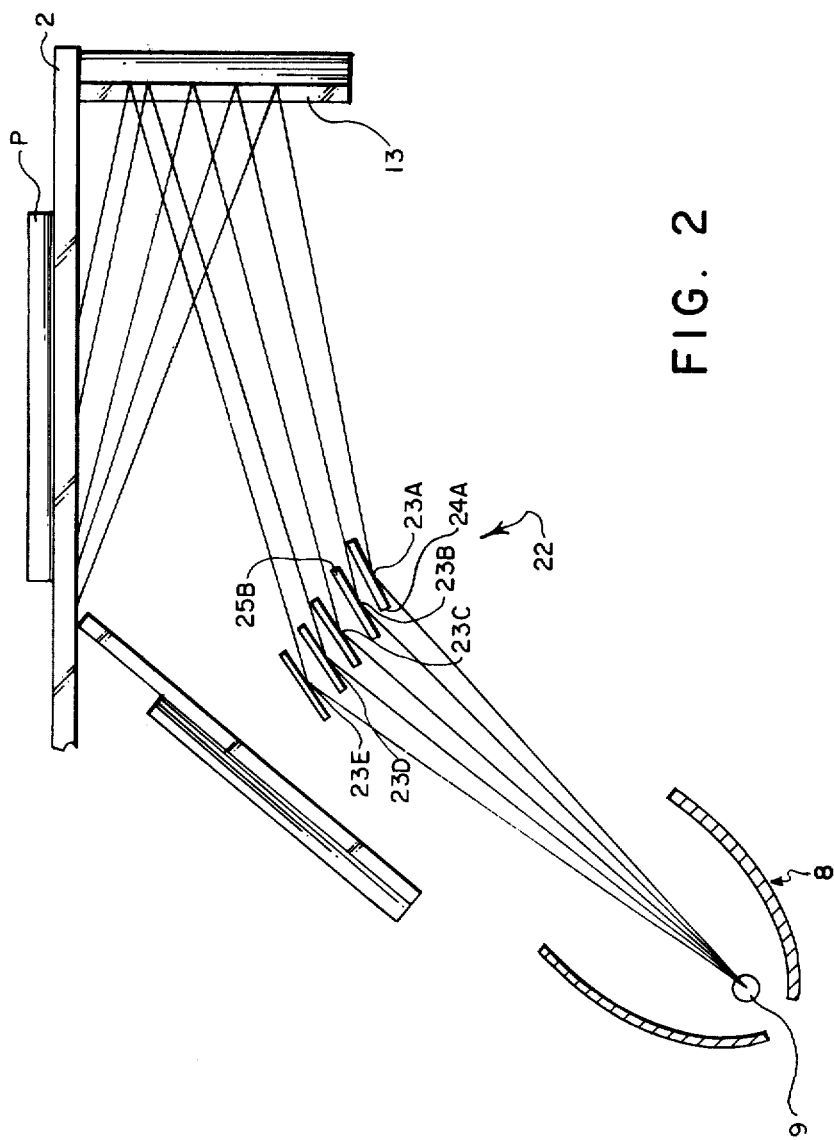
FIG. 2 is a schematic plan view of a presently preferred embodiment of the invention.

The direct rays striking the light baffle 17 are either absorbed or reflected harmlessly. Although avoiding the specular reflection problem, such absorption and dispersion of potentially useful light energy decreases the light efficiency of the illumination apparatus. In improving upon the illumination apparatus described in the copending application Ser. No. 930,287, FIG. 2 illustrates a presently preferred embodiment of a modification to the light baffle 17, showing only those rays in the bundle C illustrated in FIG. 1. A light deflector 22 is positioned substantially in place of the light baffle 17, preventing direct impingement of rays on the copy platen 2 while using the intercepted light energy in the system.

The light deflector 22 is composed of a group of elongate, planar, reflective louvers, referred to as deflectors 23A to 23E, that are juxtaposed in the path of light rays radiating from the light source 9 directly toward the print P. Each deflector 23A to 23E has a highly reflective surface facing the light source 9 disposed to efficiently reflect incident light rays. The leading edge (edge closest to the light source 9) of each deflector 23—such as the leading edge 24A of the deflector 23A—is positioned overlapping, or at least substantially in line, with the trailing edge of the adjacent deflector—such as the trailing edge 25B of the deflector 23B. Light rays emanating directly from the source therefore do not pass between the deflectors 23 without striking one of the reflecting surfaces and are thereby prevented from directly striking the copy platen 2. Instead, the light rays are reflected from each reflector 23 to the planar reflector 13, and from there upon the copy platen 2. Importantly, these light rays are directed upon the copy platen 2 at an angle of incidence comparable to that of the collimated bundles of light rays A and B. Therefore, the direct light rays from the source 9 are being used to illuminate the print P without having such an angle of incidence as to cause specular reflection.

Figure 3:
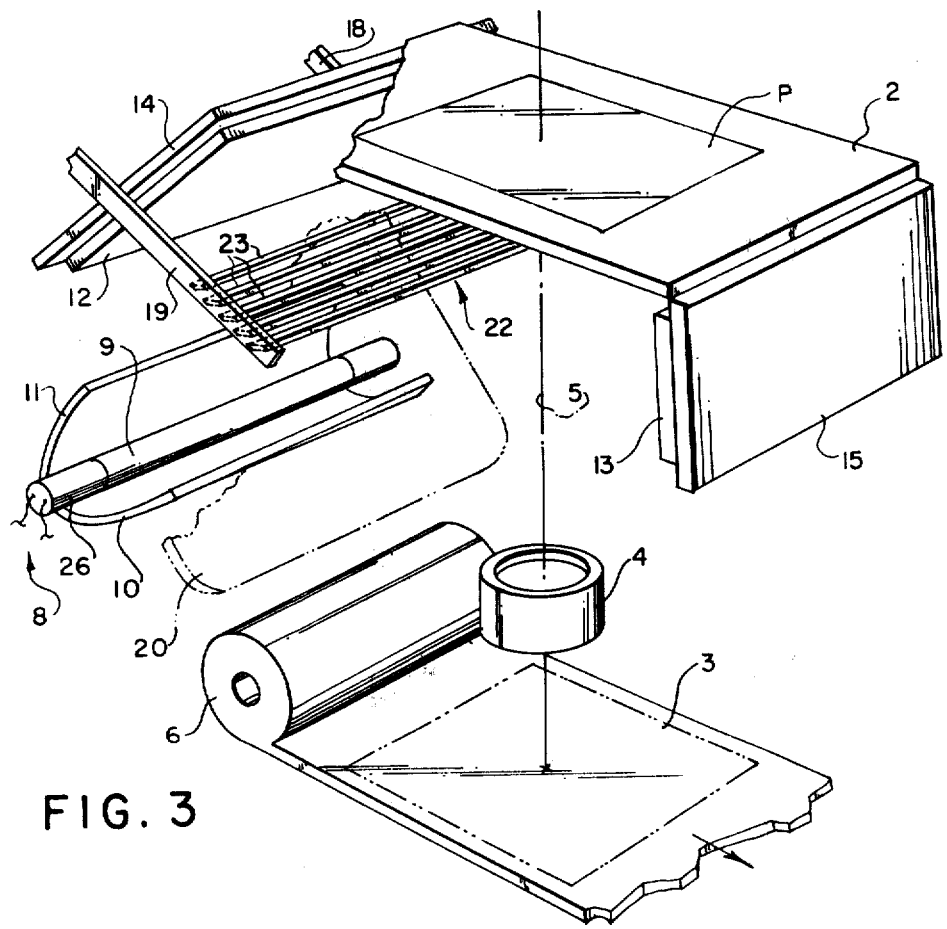
FIG. 3 is a top elevation taken in perspective to emphasize structural features of the disclosed embodiment.

Referring now to FIG. 3, the preferred embodiment is illustrated in perspective form. There it is seen that the light deflector 22 is attached to the copy platen 2 by means of a pair of brackets 18 and 19. Each bracket 18 and 19 supports individual deflectors 23 at their respective ends in a spaced relationship best described as analogous to a louver or "venetian blind" shutter. The proper orientation of each reflector 23 can be ascertained by routine manipulation within the capability of those of ordinary skill in this art. In practice an optimum orientation can be selected, and the reflectors 23 are then manufactured in place rather than being adjustable by the user.

The operation of the illumination apparatus can best be described in terms of the light ray pattern illustrated in FIGS. 1 and 2. The bundle A of light rays reflect from the parabolic mirror 11 to the planar reflector 13. From there the rays reflect back across the copy platen 2 and illuminate the print P. The bundle B of light rays reflect from the parabolic mirror 10 to the planar reflector 12. From there the rays reflect back across the copy platen 2 and also illuminate the print P. It will be noted that the light rays in each bundle remain substantially parallel after each reflection. Therefore, light intensity per unit area due to impinging rays from bundles A and B is substantially constant across the length and width of the print P. Furthermore, the intensity pattern of each bundle A and B of light rays substantially complement each other on the face of the copy platen 2—and therefore on the face of print P—making the illumination on the print substantially uniform.

The bundle C of light rays also emanates from the light source 9 and directly bears toward the print P without striking any of the reflectors 10, 11, 12, or 13. These rays instead encounter the louvered reflective surfaces of the deflector 22. Analogous to an ordinary venetian blind that is closed to block direct rays of the sun, the light rays in the bundle C cannot freely pass the deflector 22. Instead, the rays strike the surfaces of the deflectors 23A through E and reflect to the mirror 13. From there the rays reflect back across the copy platen 2 and contribute to illumination of print P. In so doing, the incident angle of the rays in the bundle C have been modified to exceed the critical angle causing specular reflection upon the photosensitive material 3. Thus, a greater amount of light energy than is possible in FIG. 1 is used to illuminate the print P and efficiency is accordingly increased. All this is accomplished without deleterious effect to the image of the print P on the photosensitive material 3.

Also it will be apparent that the disclosed apparatus can be used with various types of originals other than prints, e.g., positive or negative transparencies. Ordinary plain paper originals may be illuminated by this apparatus. While the disclosed illumination apparatus has been described with reference to a photographic printer, it will be apparent to those skilled in the art that it is not limited to this specific application. For example, in FIG. 1 the photosensitive surface 3 could equally well be the photoconductive surface of an electrographic belt assembly. After exposure to the copy original 1, the belt 3 could be advanced through conventional electrographic processing stations, e.g., toning and developing, image transfer, cleaning, charging, etc.

The invention has been described in detail with particular reference to preferred embodiments thereof, but it will be understood that variations and modifications can be effected within the spirit and scope of the invention.

What is claimed is:

1. An illumination apparatus for illuminating a planar object positioned in a predetermined plane, said apparatus comprising:
    an elongated light source positioned in spaced relationship with the object for emitting radiation some of which verges in a direction toward the object and some of which verges in other directions away from the object;
    an elongated parabolic reflecting surface positioned substantially parallel to and adjacent said light source to collimate and reflect some of the light rays verging away from the object in a first predetermined path;
    a louvered light deflector positioned between said source and the object to pass and deflect some of the light rays verging toward the object in a second predetermined path intersecting with said first predetermined path; and
    a planar reflecting surface positioned in the intersection of said first and second paths to reflect upon the object the collimated light rays reflected from said parabolic reflecting surface and the direct light rays deflected by said light deflector.

2. An illumination apparatus for use with an elongated light source for illuminating the surface of an object positioned in the optical axis of a photographic printer, the apparatus comprising:
    means for supporting the light source in spaced relationship with the object and the optical axis;
    a pair of planar reflecting surfaces positioned at opposite sides of the object to reflect light rays originating from the source directly upon the object;
    two elongated parabolic reflecting surfaces, each positioned substantially parallel to and adjacent opposite sides of said source to collimate and reflect light rays emitted by the source in directions away from the object toward said planar reflecting surfaces respectively;
    a plurality of elongate light deflecting surfaces juxtaposed in the path of light rays emitted from the source directly toward the object; and
    means for supporting said plurality of elongate deflecting surfaces in spaced parallel relationship to form a plurality of elongate light passageways between adjacent surfaces to pass at least some of said light rays emitted directly toward the object and to deflect said passed light rays to at least one of said planar reflecting surfaces, said planar reflecting surfaces being positioned to reflect said passed light rays and said collimated light rays upon the object.

* * * * *